US012763048B2

(12) United States Patent
Law et al.

(10) Patent No.: US 12,763,048 B2
(45) Date of Patent: Oct. 13, 2026

(54) DOCUMENT HOLDER

(71) Applicant: NOISY CLAN LTD, Glasgow (GB)

(72) Inventors: David Law, Edinburgh (GB); Philip Smith, Glasgow (GB)

(73) Assignee: NOISY CLAN LTD, Glasgow (GB)

( * ) Notice: Subject to any disclaimer, the term of this patent is extended or adjusted under 35 U.S.C. 154(b) by 450 days.

(21) Appl. No.: 18/326,184

(22) Filed: May 31, 2023

(65) Prior Publication Data

US 2023/0386436 A1 Nov. 30, 2023

(30) Foreign Application Priority Data

May 31, 2022 (GB) ...................................... 2208057

(51) Int. Cl.
*G10G 1/00* (2006.01)
*G09B 15/00* (2006.01)

(52) U.S. Cl.
CPC ............. *G10G 1/00* (2013.01); *G09B 15/008* (2013.01)

(58) Field of Classification Search
CPC ................................ G10G 1/00; G09B 15/008
See application file for complete search history.

(56) References Cited

U.S. PATENT DOCUMENTS 2,649,008 A * 8/1953 Bova .................... G09B 15/008 84/474
2,971,733 A * 2/1961 Silverman ............ A47B 23/044 281/33
3,888,155 A * 6/1975 Leonard ............... G09B 15/008 84/485 R (Continued)

FOREIGN PATENT DOCUMENTS

CN 2090086 U 12/1991
EP 2560071 A2 * 2/2013 ........... G06F 1/1626

(Continued)

OTHER PUBLICATIONS

European Patent Office, International Search Report and Written Opinion of the International Searching Authority, Sep. 21, 2023, 12 pages.

(Continued)

*Primary Examiner* — Robert W Horn
(74) *Attorney, Agent, or Firm* — Perkins IP Law Group LLC; Jefferson Perkins

(57) ABSTRACT

The invention provides a document holder (10), which can be used flat or standing. The document holder (10) includes a document receiving member (15), and a foldable flexible panel (22), which includes a first member (28) and a second member (30), wherein the first member (28) and second member (30) are configured to be folded rearwards and inwards and to be joined together to define a stand. The foldable flexible panel (22) is partially attached to the back of the document receiving member (15), such that to configure the document holder (10) as a standing document holder the foldable panel (22) folds rearwards and inwards relative to the back of the document receiving member (15), wherein the first and second members (28, 30) are joined together to create a substantially triangular base member, which extends rearward, thereby providing a stand for the document holder (10).

21 Claims, 10 Drawing Sheets

(56) References Cited

U.S. PATENT DOCUMENTS

| | | | | | |
|---|---|---|---|---|---|
| 5,167,394 | A * | 12/1992 | Hegarty | B42F 13/402 248/458 |
| 5,722,628 | A * | 3/1998 | Menaged | A47B 23/043 248/455 |
| 8,757,375 | B2 * | 6/2014 | Huang | A47B 23/043 206/45.24 |
| 8,915,357 | B2 * | 12/2014 | Mecchella | A45C 11/00 206/320 |
| 9,226,559 | B1 * | 1/2016 | Diebel | H05K 5/03 |
| 10,716,376 | B2 * | 7/2020 | Buechin | A45C 11/00 |
| 11,209,870 | B1 | 12/2021 | Li et al. | |
| 2007/0039218 | A1 * | 2/2007 | Shaffer | G09F 1/06 40/605 |
| 2013/0048517 | A1 * | 2/2013 | Mecchella | A45C 11/00 206/216 |
| 2013/0258586 | A1 * | 10/2013 | Shao | G06F 1/1613 248/688 |
| 2020/0121046 | A1 | 4/2020 | Buechin et al. | |
| 2023/0386436 | A1 * | 11/2023 | Law | G10G 1/00 |

FOREIGN PATENT DOCUMENTS

| | | | | |
|---|---|---|---|---|
| EP | 2657587 | A2 | 10/2013 | |
| GB | 2404077 | A * | 1/2005 | G10G 1/02 |
| JP | 9164045 | A | 6/1997 | |
| JP | 3878659 | B1 | 2/2007 | |
| WO | 2015003285 | A1 | 1/2015 | |

OTHER PUBLICATIONS

Noisy Clan, Noisy decoder, https://shop.uk.noisyclan.com/products/noisy-decoder, Nov. 25, 2022, 2 pages.

United Kingdom Intellectual Property Office, Patent Search Report for GB2208057.6, Nov. 29, 2022, 4 pages.

* cited by examiner

DOCUMENT HOLDER

FIELD OF THE INVENTION

The present invention relates to a document holder incorporating a stand. More particularly, the present invention relates to a document holder including a foldable panel, which can be configured to define a stand.

BACKGROUND OF THE INVENTION

Typically, a document holder has a panel with a flat face surface against which a document is received and it can include a clip or a ledge to retain and support a document. A document holder often includes a bracket that extends outwardly from the back surface of the panel to retain the document copy holder in a selected, inclined position relative to the surface on which the document holder is placed.

SUMMARY OF THE INVENTION

The present invention provides a document holder, which can be used flat or standing, the document holder comprising:

- a document receiving member, which includes a front and a back; and
- at least one foldable flexible panel which includes a first member and a second member, wherein the first member and second member are configured to be folded rearwards and to be joined together to define a stand,
- wherein the foldable flexible panel is partially attached to the back of the document receiving member, such that to configure the document holder as a standing document holder the at least one foldable panel folds rearwards and inwards relative to the back of document holder, and the first and second members are joined together to create a substantially triangular base member, which extends rearward, thereby providing a stand for the document holder.

The at least one foldable panel and the first and second members may be provided by two arms, which are each attached to one edge of the document receiving member proximate a lower edge, wherein the arms are configured to extend diagonally rearwards and inwards to be connected together to provide the substantially triangular base member, thereby providing the stand for the document holder.

Alternatively, the at least one foldable panel may be provided by a rectangular/substantially square-shaped panel, which includes four diagonal crease lines forming a cross-shape about which the foldable panel folds to create the substantially triangular base member, thereby providing the stand for the document holder, wherein the first and second members may be provided by upper corners of the rectangular/substantially square-shaped panel foldable panel.

A lower triangular portion, defined by a bottom edge of the foldable panel and two lowermost diagonal crease lines may be fixed/adhered to the back of the document holder.

The first and second members may include fasteners that hold the foldable panel in a flat open configuration relative to the back of the document receiving member and wherein the fasteners also join the first and second members to create the substantially triangular base member, which extends rearward, thereby providing the stand for the document holder The fasteners may be re-usable fasteners. For example, the fasteners may be provided by press-studs, reusable adhesive pads, hook and loop tape, magnets etc. Suitable fasteners serve the purpose of securing the first and second members to the back of the document receiving member and to join the first and second members together when forming the stand.

The document receiving member may be a sleeve including at least an open top edge or side edge, wherein the open edge includes a notch.

The document holder may further comprise a disc within the document receiving member, wherein an edge of the disc is accessible via the notch.

The disc may be secured to document receiving member about a pivot point to facilitate rotation of the disc relative to the document receiving member.

The notch exposes a portion of the disc to facilitate grip for rotation of the disc.

The disc may include a grooved outer edge.

An exposed front face of the document receiving member may include an upper array of holes located proximate an outer first circumference and a lower array of holes arranged around a second circumference which is radially smaller than first circumference, wherein the holes are arranged to display a predetermined selection of information printed on the disc. In an example, the disc is printed with twelve notes of the musical alphabet, wherein an outer circle represents key signatures, where capital letters represent the major keys and an inner circle includes lowercase letters to represent minor keys.

The document receiving member may be a rectangular-shaped sleeve document and the foldable panel may be substantially square-shaped and located towards the bottom edge of the document receiving member.

The document holder may comprise a folded unitary sheet-material, which in the folded, in use, configuration defines the document receiving member and the foldable panel wherein the document receiving member is defined by an inverted U-shaped folded upper edge, a front panel and a rear panel, wherein the document receiving member includes open side edges, such that a document can be inserted via the side edges and is sandwiched between the front panel and the rear panel; and a U-shaped folded bottom edge, which defines an integral joint between the front panel and the foldable panel and, wherein the bottom folded edge closes an otherwise open bottom edge of the document receiving member.

Alternatively, the document holder may comprise a folded unitary sheet of material, defining a bottom edge U-shaped fold, thereby providing a front facing document receiving member defined by a single leaf and a rearward facing foldable panel, which can be folded to form a stand to support the document receiving member in an upright orientation and further comprising at least one retaining member to secure a document to the document receiving member.

The retaining member may be one or more clasps located proximate an upper, lower or side edge of the document receiving member.

The foldable panel may be attached to the back of the document receiving member by a pivotal connector, such that the foldable panel can rotate relative to the document receiving member such that orientation of the document receiving member, when supported on the stand, can be reoriented between landscape and portrait orientation.

BRIEF DESCRIPTION OF DRAWINGS

Examples of the invention will now be described, by way of example, with reference to the drawings, in which.

DETAILED DESCRIPTION

Figure 2:
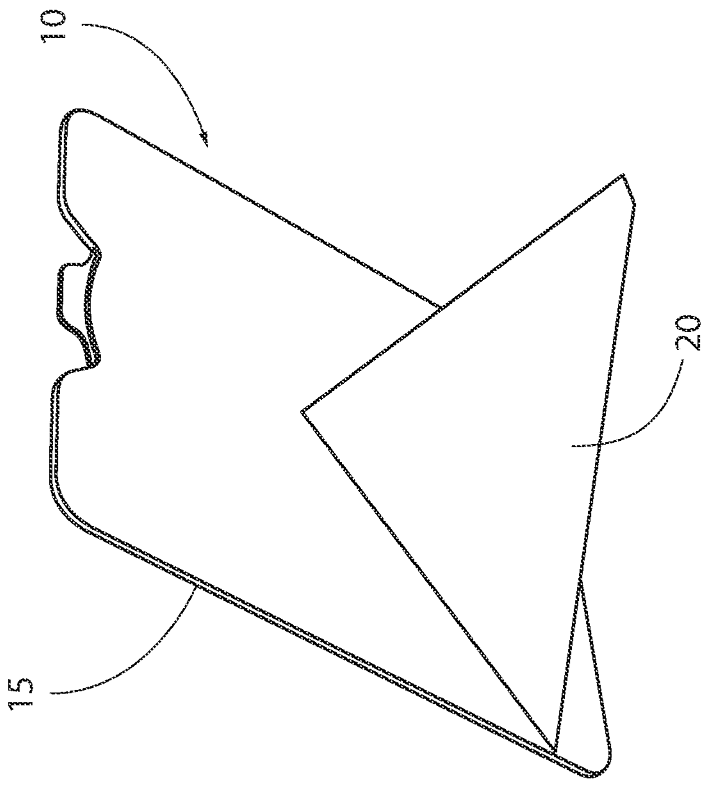
FIG. 2 illustrates a rear perspective view of the document of FIG. 1 showing a stand deployed.
Figure 1:
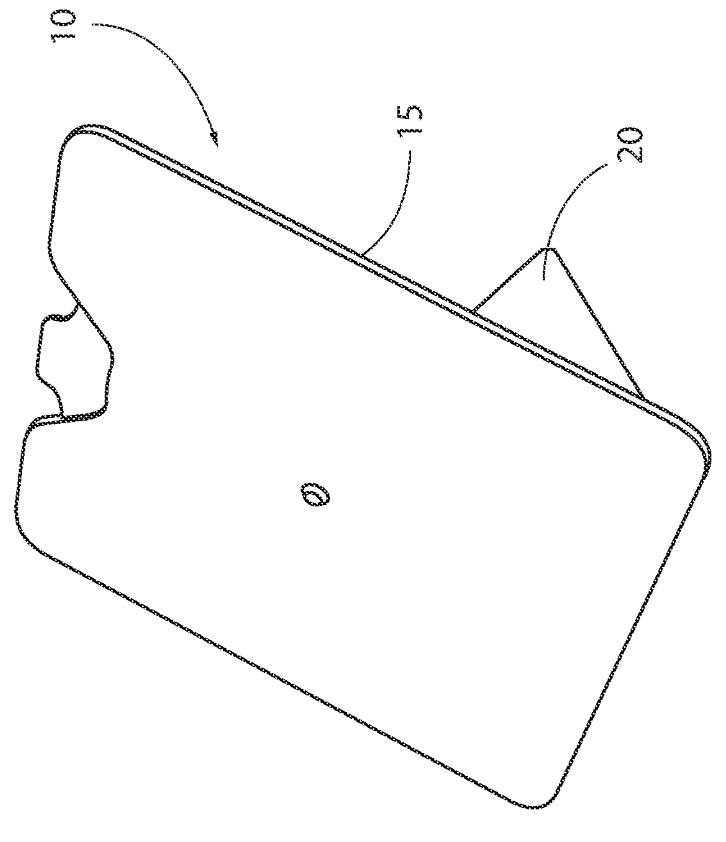
FIG. 1 illustrates a front perspective view of a document holder according to an example of the present invention.
Figure 3:
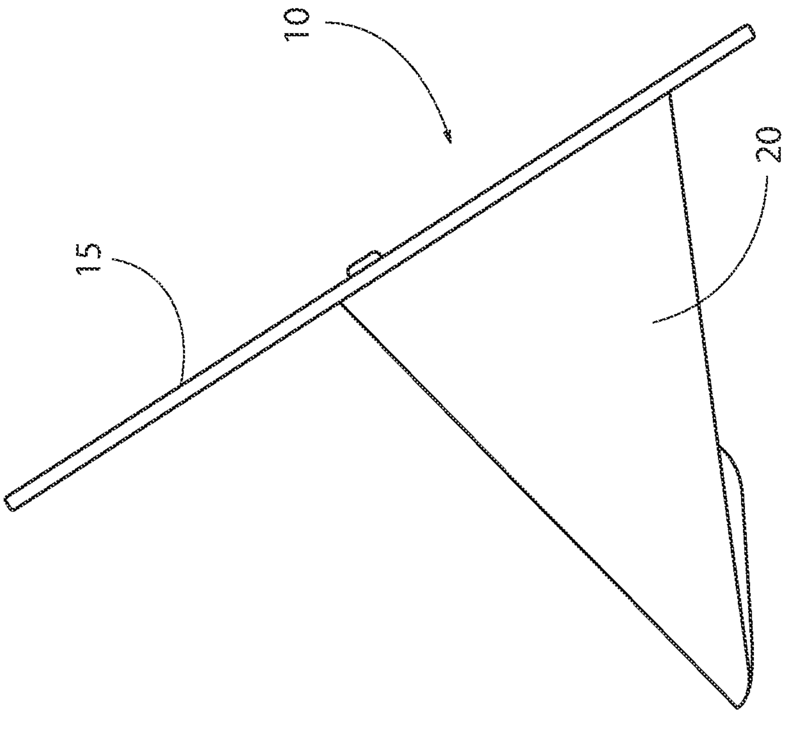
FIG. 3 shows a side view of the document holder of FIG. 1 and FIG. 2 showing a stand deployed.

FIGS. 1, 2 and 3 illustrate a document holder 10, which includes a document receiving member 15 and a stand 20.

Referring to FIGS. 4*a* to 4*g*, the stand 20 is created by folding a foldable panel 22, which is attached to the back of the document receiving member 15.

Figure 4F:
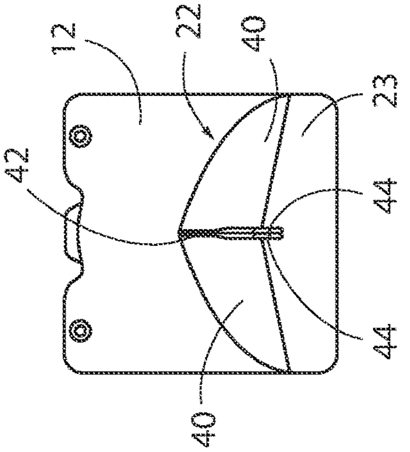
FIGS. 4*a* to 4*g* illustrate the steps of deploying the stand as illustrated in FIG. 1 to FIG. 3.
Figure 4D:
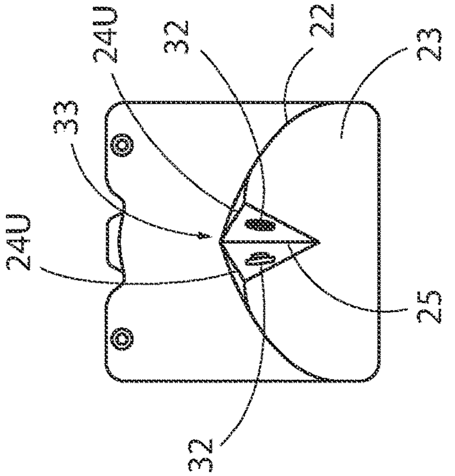

In the illustrated example shown in FIG. 4*a*, the foldable panel 22 is rectangular or substantially square-shaped and includes diagonal crease lines 24U, 24L forming a cross-shape 26 about which the foldable panel 22 folds to create the stand 20 as described further below.

Figure 4B:
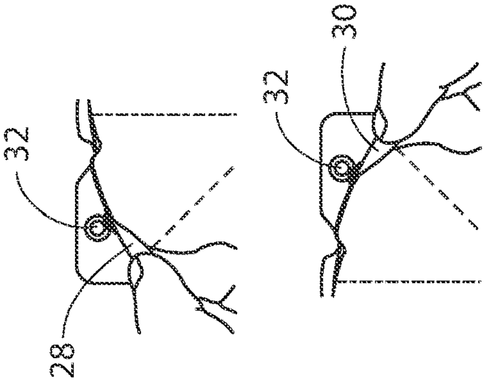
Figure 4A:
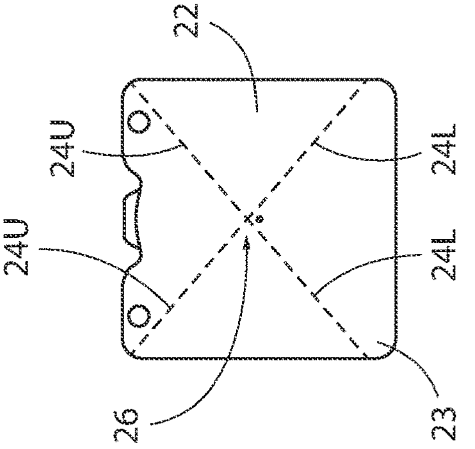
Figure 4G:
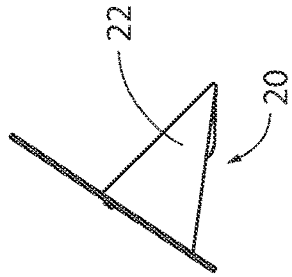
Figure 4E:
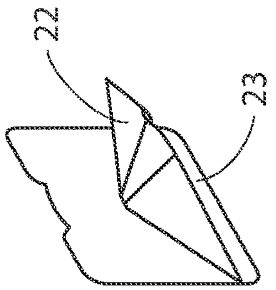
Figure 4C:
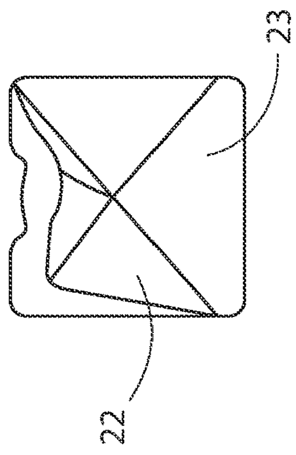

The extent of the crease lines 24L does not extend to the bottom 60 of the document holder 10 such that when the stand 20 is created from the foldable panel the document receiving member 15 is supported in a rearward incline (see FIG. 4*g*).

In the illustrated example, a lower triangular portion 23 of the foldable panel 22 is adhered or otherwise fixed to the rear surface of the document receiving member 15.

The upper corners 28, 30 of the foldable panel 22 are held in an open configuration by fasteners 32. In this example, the fasteners are press-studs 32, but it will be appreciated that other fasteners e.g., reusable adhesive pads, hook and loop tape, magnets etc. could be used instead or in addition. Suitable fasteners serve the purpose of securing the corners 28, 30 to the back of the document holder 10 and to join the corners 28, 30 together when the foldable panel 22 is folded.

In the open configuration the document holder 10 is flat, which makes it suitable for ease of holding in a user's hand, stacking etc.

The document holder 10 is easily converted to a standing document holder by converting the foldable panel 22 to the stand 20 as illustrated with reference to FIGS. 4*b* to 4*g*.

FIG. 4*b* illustrates the first step to forming the integral stand 20 from the foldable panel 22 by releasing each upper corner 28, 30 from the fasteners 32 on the back of the document holder 10.

Each corner 28, 30 is then displaced diagonally and pushed towards the bottom centre 62 of the document holder 10. This action creates a rearward fold about the upper crease lines 24U. In addition to folding about the upper crease lines 24U, this action brings the corners 28, 30 towards each other, i.e. pushing inwards which creates a downward fold about a centre crease line 25, thereby forming a channel 33 between two triangular panels 27. When the corners 28, 30 come together the fasteners 32 can be engaged to lock the corners 28, 30 and edges together thereby creating the stand 20.

Referring to FIG. 4*f* and FIG. 4*g*, the visible features of the stand 22 are two substantially triangular shaped panels 40, each extending outward from the rear face 12 of the document holder 10, where one edge (defined by the crease lines 24U) and corner 44 of each triangular panel 40 meet. The interface 42 defined between the mating edges and corners 40 is closed by the fastened corners 28, 30 as described above.

In the deployed configuration, the stand 20 rests on a flat surface to create a rearward tilt of the document holder when the document holder 10 is in the upright deployed position (see FIGS. 4*f* and 4*g*).

FIGS. 1 to 4*g* represent a substantially square-shaped document holder, where the foldable panel 22 extends substantially from top to bottom of the document holder.

Figure 5B:
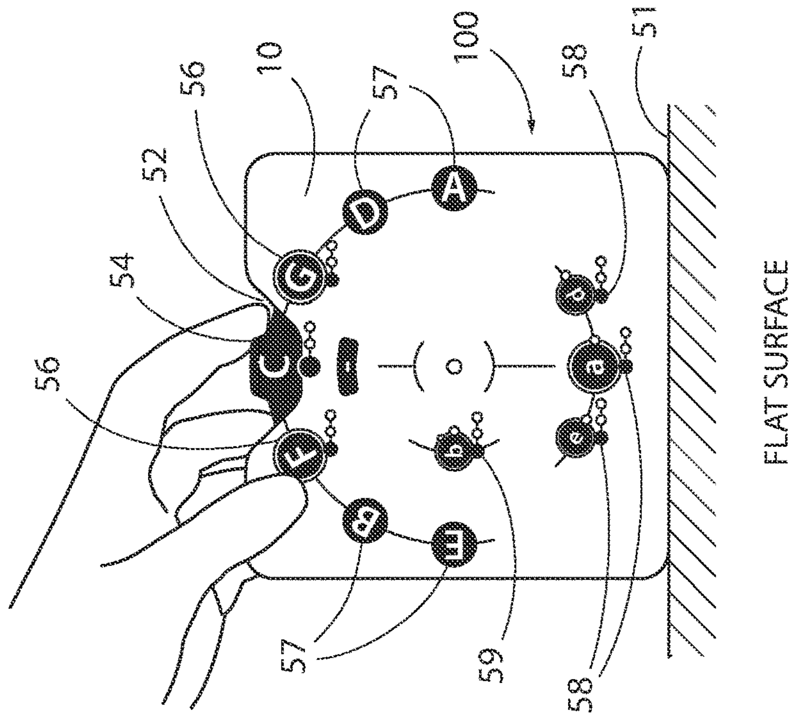
FIGS. 5*a* and 5*b* illustrate a musical theory tool as an example of an application of the document holder of FIGS. 1 to FIG. 4*g;*
Figure 5A:
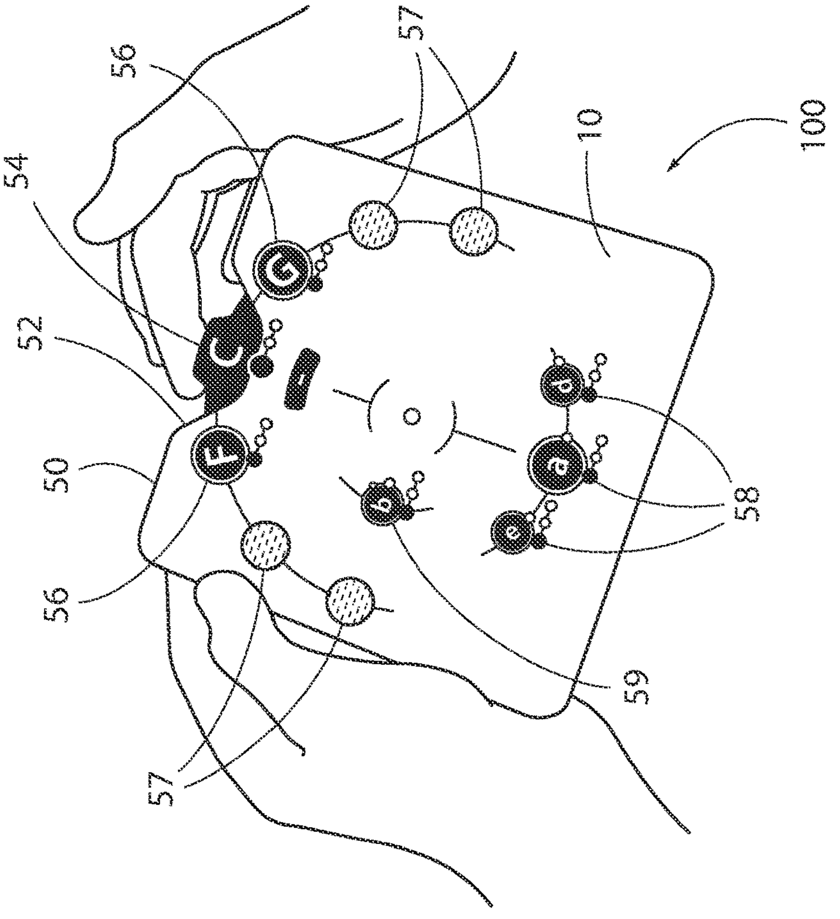

FIGS. 5*a* and 5*b* illustrate a music theory tool 100 as an example application for the substantially square-shaped document holder 10. FIG. 5*a* illustrates the document holder held in a user's hand i.e., in a flat configuration where the foldable panel 22 (not visible) is unfolded. FIG. 5*b* illustrates the document holder 10 in an upright position i.e., utilising the stand 20 (not visible) on a flat surface 51 as described above.

The music theory tool 100 represents the circle of fifths. The circle of fifths being an arrangement of the twelve notes of the musical alphabet in a circle. Each note on the circle is arranged such that it is a perfect fifth apart. At the top of the circle we begin on the note C and as you go clockwise around the circle, the notes move in perfect fifths i.e., C, G, D, A, E . . . .

In the illustrated example, the document holder 10 is a sleeve including an open top edge 50, which includes a notch 52.

A disc 54 is contained in the sleeve with an edge of the disc being accessible via the notch 52. A rivet through the document holder and the centre C of the disc 54 secures the disc 54 and provides pivot point to facilitate rotation of the disc 54 relative to the document holder 10. It will be appreciated the notch 52 is provided to expose a portion of the disc 54 to facilitate grip for rotation of the disc 54. In the illustrated example, the notch 52 is provided at the upper edge 50 of the document holder 10, but it will be appreciated a notch could be provided on any edge.

In the illustrated example, the disc 54 is grooved for ease of contact with a finger to rotate the disc clockwise/counter-clockwise relative to the sleeve/document holder 10.

The disc 54 is printed with an outer circle 66, on a first circumference, representing actual key signatures, where capital letters represent the major keys and an inner circle 68, on a second circumference, including lowercase letters to represent minor keys. The first circumference is radially inward from but proximate to the edge of the disc, while the second circumference is radially inward from the first circumference.

The exposed front face 55 of the document holder includes an upper/outer array of two windows 56 and further four part-opacity windows 57 all on the first circumference so only the relevant information is viewed at a time. The upper/outer windows 55 are arranged and spaced to correspond with the key signatures and a lower array of three windows 58, disposed on the second circumference, correspond with the lowercase lettering indicating the relative minor keys.

In the illustrated embodiment, a further window 59 is provided on the horizontal axis of the document receiving member. Window 59 otherwise may be placed anywhere at a third circumference that is radially closer to centre C than is the second circumference. This window 59 displays diminished chords.

This arrangement means that at any given time the document holder displays seven chords i.e., three major, three minor and one diminished.

To change the keys/chords displayed the disc 54 is rotated clockwise/anti-clockwise such that the keys/chords are displayed at the notch 52 and through the windows 56, 58, 59 on the front face of the document holder 10 providing the music theory tool 100.

Figure 6:
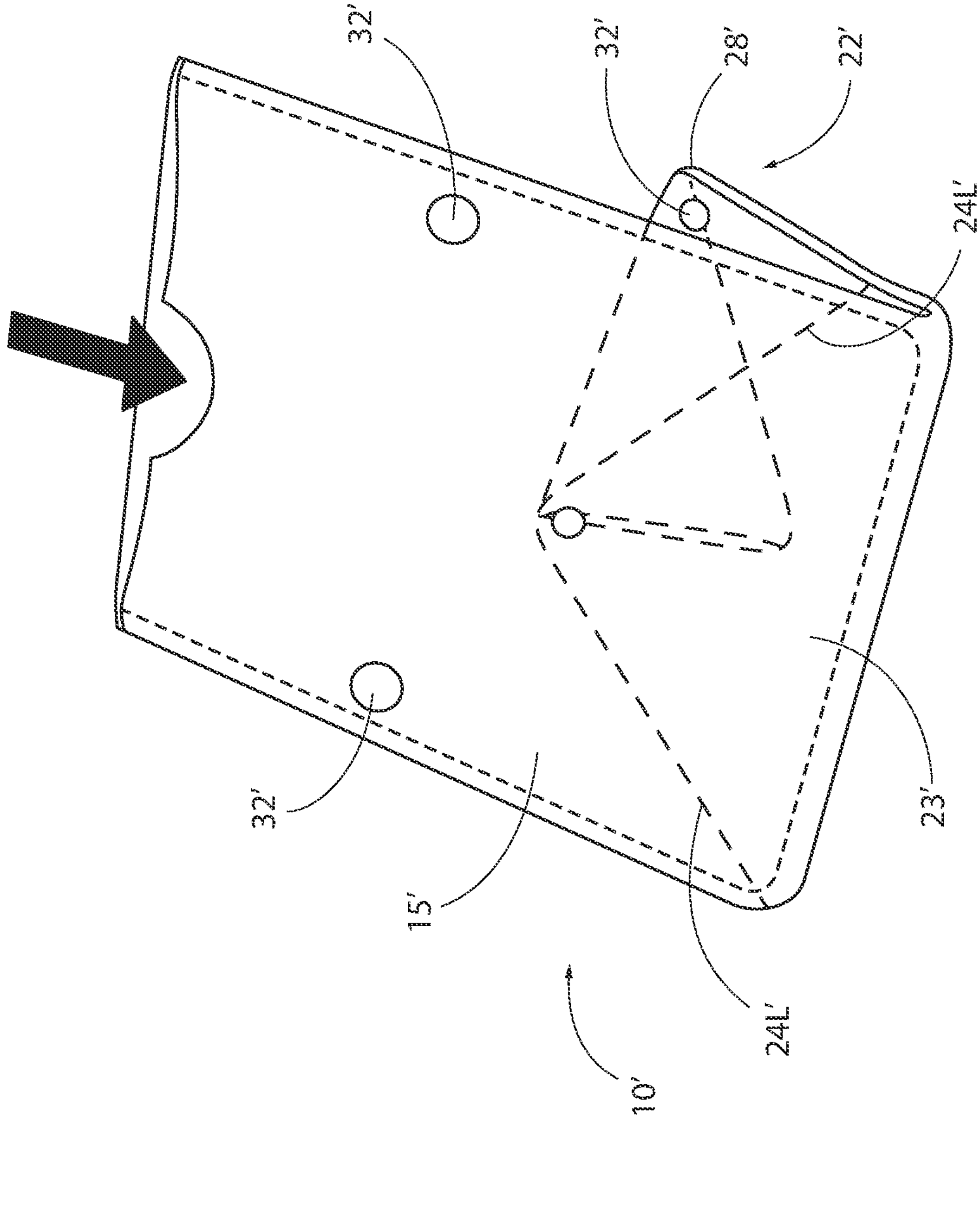
FIG. 6 illustrates another example of a document holder showing an application of the stand component of the document holder illustrated in FIG. 1 to FIG. 5.

FIG. 6 illustrates a rectangular-shaped sleeve document holder 10', which includes a document receiving member 15' configured to hold A4 or Letter sized documents. The document holder 10' includes a foldable panel 22' on the rear surface, where the foldable panel 22' is substantially square-shaped and is located towards the bottom edge 60' of the document holder 10'.

In this example the document receiving member 15' includes heat sealed side and bottom edges and is open at the upper edge to receive a document/documents.

The foldable panel 22' includes diagonal crease lines 24U', 24L' forming a cross-shape about which the foldable panel 22' folds to create a stand 20' as described further below.

In the illustrated example, a lower triangular portion 23', of the foldable panel 22', is fixed/adhered to the rear surface of the document holder 10'.

The upper corners 28', 30' of the foldable panel 22' are held in an open configuration by fasteners 32'. In this example, the fasteners are press-studs 32', but it will be appreciated other fasteners e.g., reusable adhesive pads, hook and loop tape, magnets etc. would be suitable. Suitable fasteners serve the purpose of securing the corners 28, 30 to the back of the document holder 10' and to join the corners 28', 30' together when the foldable panel 22' is folded.

When the foldable panel 22' is in the open configuration the document holder 10' is flat, which makes it suitable for ease of holding in a user's hand, stacking etc.

As described above, with reference to FIGS. 4*b* to 4*g*, the document holder 10' is easily converted to a standing document holder by converting the foldable panel 22' to the stand by folding the corners 28', 30' about the crease lines 24U' and 25' to form a triangular base support.

Figure 7:
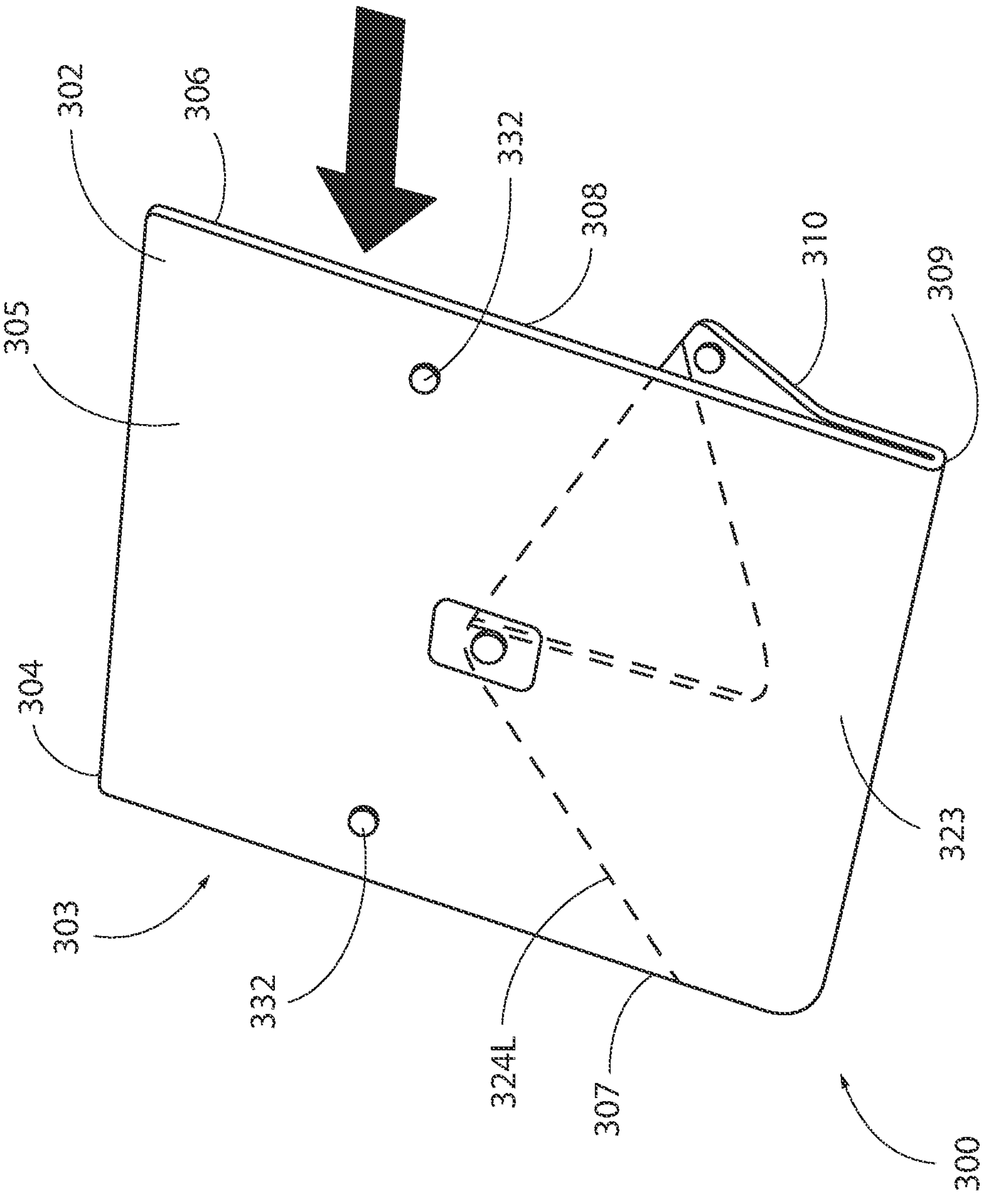
FIG. 7 illustrates another example of a document holder with the foldable stand component of FIGS. 1 to 4*g;*

FIG. 7 illustrates a document holder 300, which is formed from folded sheet-material 302, which defines a sheet holder 303 and a foldable rear panel 310 to create the stand as described above with reference to FIGS. 4*a* to 4*g*. The sheet holder 303 is defined by a folded upper edge 304, a front panel 305 and a rear panel 306.

The document holder 303 includes open side edges 307, 308 a document can be inserted via the side edges and is sandwiched between the front panel 305 and the rear panel 306. At least the front panel 305 is transparent.

The document holder 300 includes a second folded edge i.e., a folded bottom edge 309, which joins the front panel 305 the foldable panel 310 and closes the bottom edge of the sheet holder defined by the front panel 305 and the rear panel 306 of the sheet holder 303.

The foldable panel 310 includes a diagonal crease lines 324U, 324L forming a cross-shape about which the foldable panel 310 folds to create a stand 320 as described further below.

In the illustrated example, a lower triangular portion 323, of the foldable panel 310, is fixed/adhered to the rear panel 306 of the sheet holder 303.

The upper corners 328, 330 of the foldable panel 310 are held in an open configuration by fasteners 332. In this example, the fasteners are press-studs 332, but it will be appreciated other fasteners e.g., reusable adhesive pads, hook and loop tape, magnets etc. would be suitable. Suitable fasteners serve the purpose of securing the corners to the back of the sheet holder and to join the corners together when the foldable panel 310 is folded.

In the open configuration the document holder 300 is flat, which makes it suitable for ease of holding in a user's hand, stacking etc.

As described above with reference to FIGS. 4*b* to 4*g*, the document holder 300 is easily converted to a standing document holder by converting the foldable panel 310 to the stand 320 by folding the corners 328, 330 about the crease lines 324U and 325 to form a triangular base support.

Figure 8:
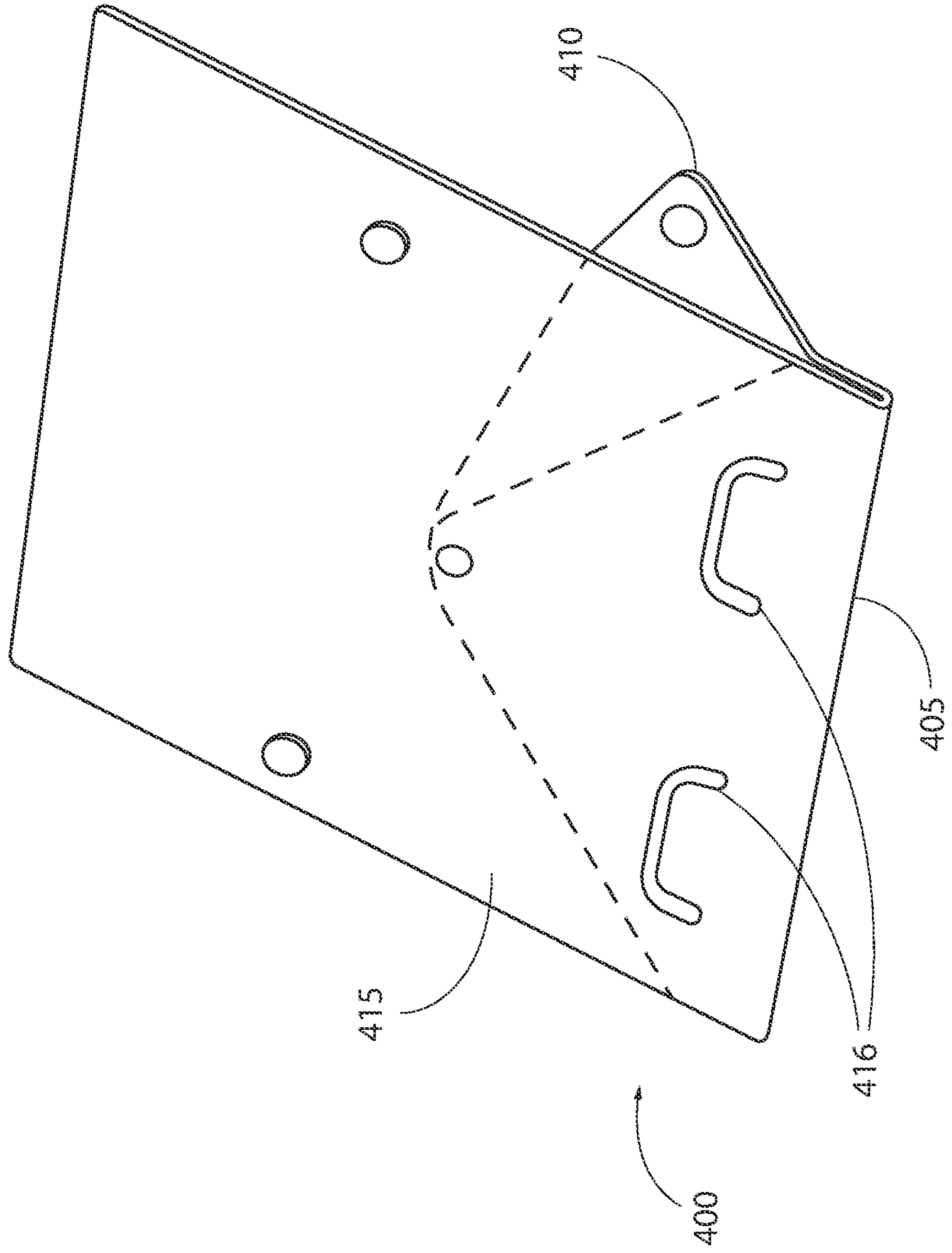
FIG. 8 illustrates another example of a document holder with the foldable stand component of FIGS. 1 to 4*g;*

FIG. 8 illustrates a further example of a document holder 400 which is created from folded sheet material. In this example, the bottom edge 405 is folded to define a front panel as a document receiving member 415 and a rear panel providing the foldable panel 410 that is folded to form a stand 420 to support the document holder 400 in an upright orientation.

In this example, the document receiving member 415 includes two retaining clips/tabs 416 located proximate the folded edge 405, where the clips/tabs 416 are configured to hold a document placed on the forward surface of the document receiving member 415.

The foldable panel 410 includes diagonal crease lines and fasteners as described above with reference to FIGS. 4*a* to 4*g*. The foldable panel 410, when folded about the crease lines and secured with the fasteners creates a stand to support the document receiving member 415 in rearward incline in an upright orientation.

Figure 9B:
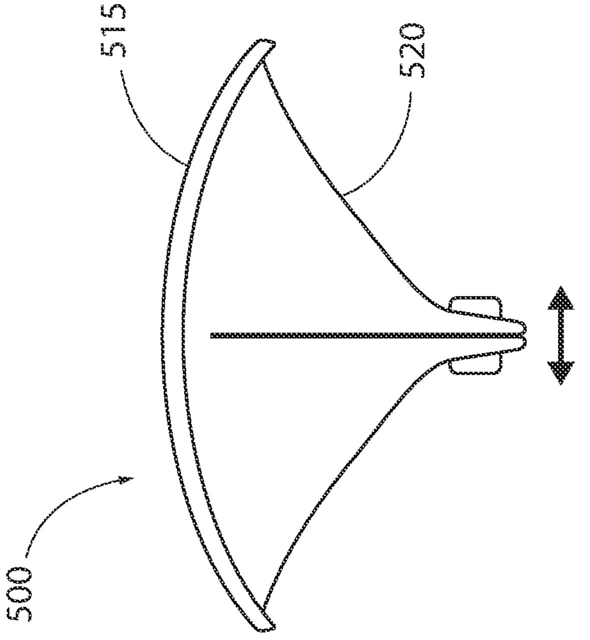
FIGS. 9*a* and 9*b* illustrate another example of a document holder with the foldable stand component of FIGS. 1 to 4*g;*
Figure 9A:
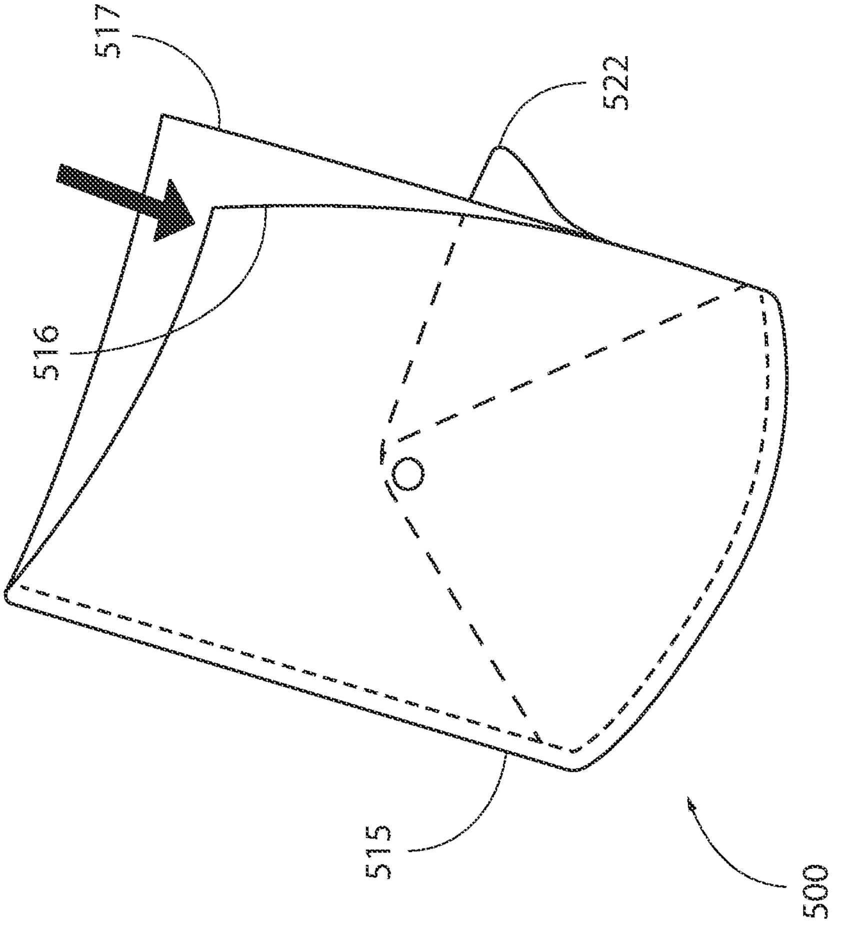

FIGS. 9*a* and 9*b* illustrate a further example of a document holder 500, which includes a document receiving member 515, which includes two leaves 516, 517 sealed along one side and a lower edge and open along one side and a top edge, where a document can be inserted between the leaves from the open top or side edge. A foldable panel 522 is attached to the rear of the document holder 500.

The foldable panel 522 includes diagonal crease lines and fasteners as described above with reference to FIGS. 4*a* to 4*g*. The foldable panel 522 being folded about the crease lines and secured with the fasteners to create the stand 520 to support the document receiving member 515 in rearward incline in an upright orientation Forming the stand (see FIG. 9*b*) creates a curvature across the document receiving member 515.

Figure 10B:
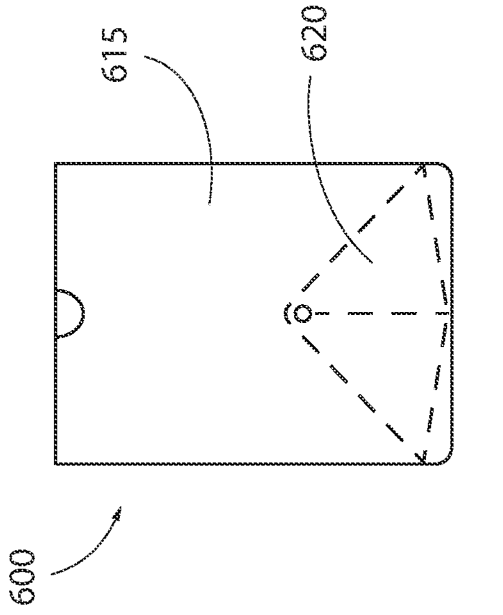
FIGS. 10*a*, 10*b* and 10*c* illustrate another example of a document holder with the foldable stand component of FIGS. 1 to 4*g*; and FIGS. 11*a* to FIG. 11*d* illustrates another document holder with an alternative stand configuration relative to FIGS. 1 to 4*g*.
Figure 10C:
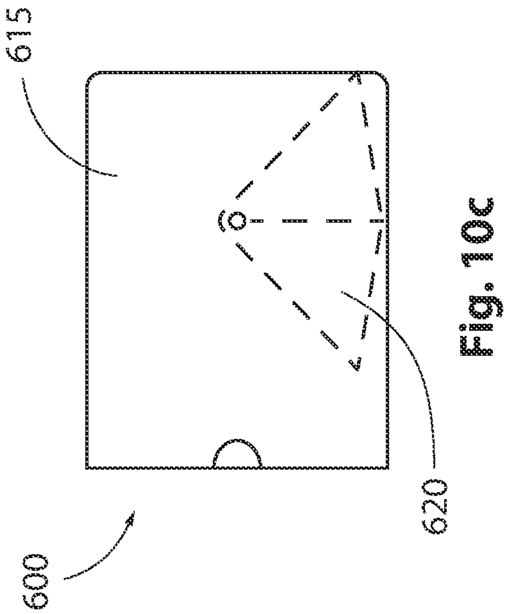
Figure 10A:
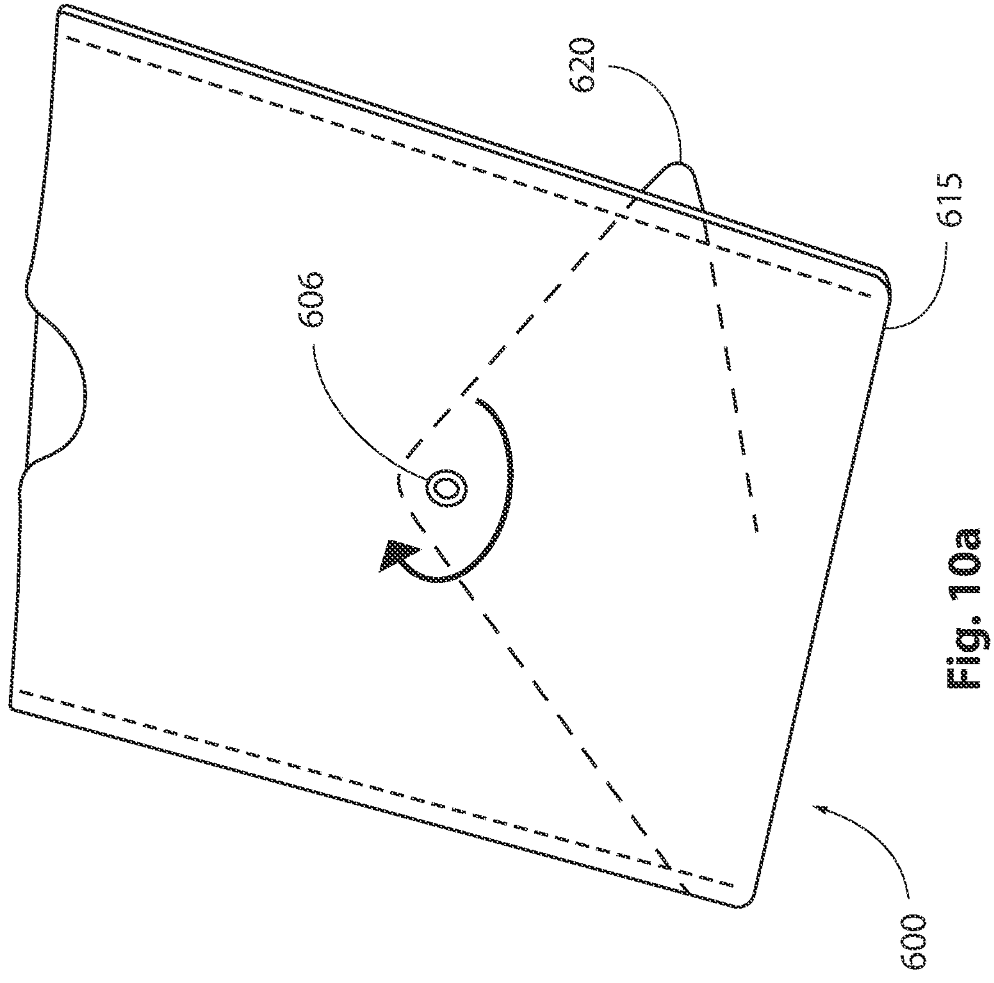

FIG. 10*a* illustrates a document holder 600, which includes a foldable panel 602, which is substantially triangular in shape and is pivotally connected to the rear face 604 of the document receiving member 615. The foldable panel 202 is folded to form a triangular based stand 620 can be rotated about the pivot point 606 to orientate the stand 620 to support the document receiving member 615 in landscape orientation (see FIG. 10*b*) or portrait orientation (se FIG. 10*c*).

Figure 11B:
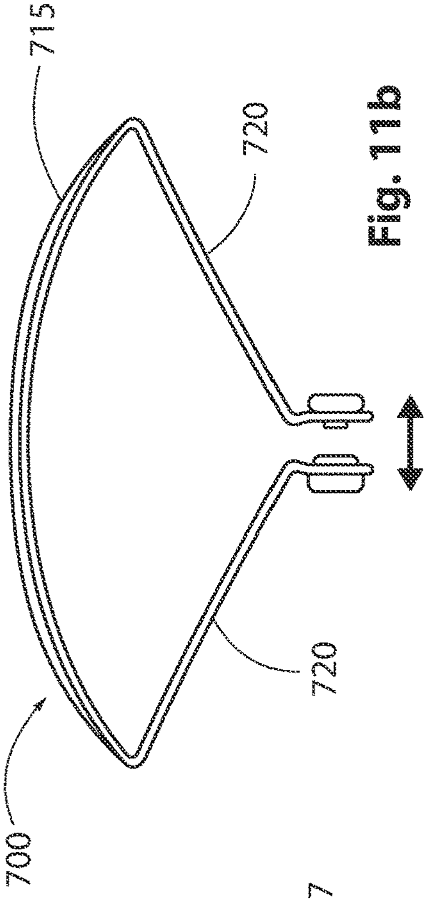
Figure 11D:
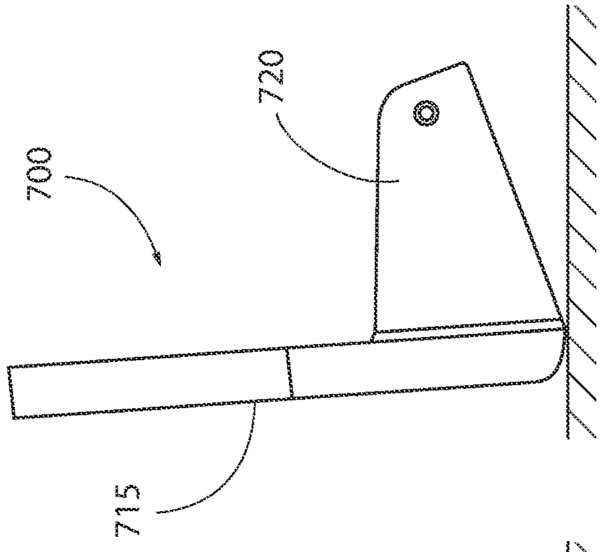
Figure 11C:
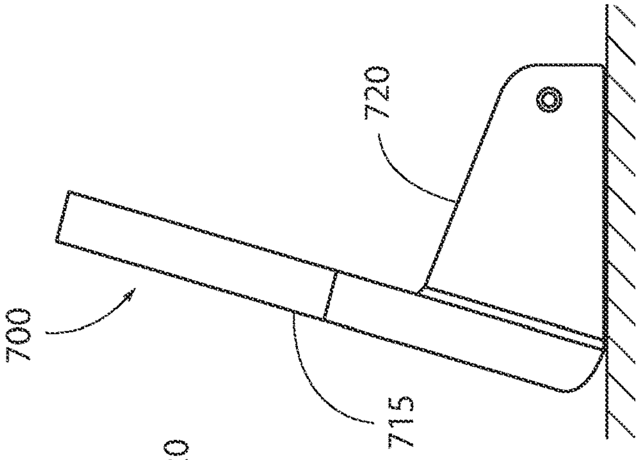
Figure 11A:
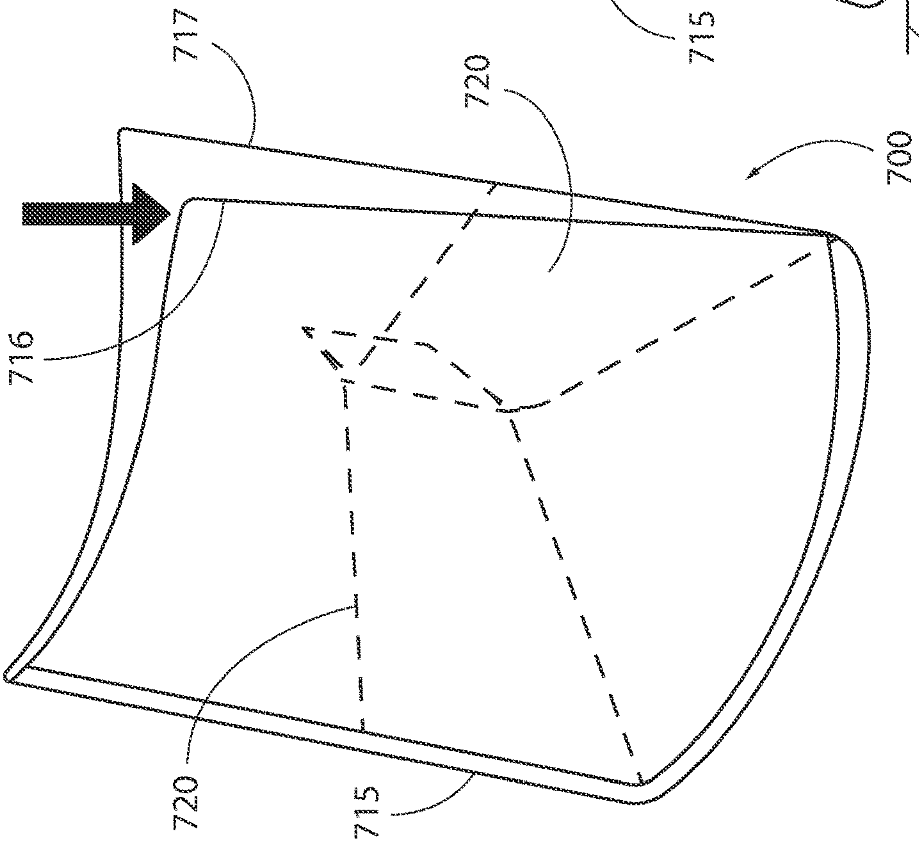

FIG. 11*a* illustrates a further example of a document holder 700, which includes a document receiving member 715 defined by two leaves 716, 717 sealed along one side edge and a lower edge and open along one side edge and a top edge, where a document can be inserted between the leaves 716, 717 from the open top or side edge. Two arms 720 are attached to the sides of the document receiving member 715 and when pulled together rearwards and inwards they form a triangular base support to support the document receiving member 715 in rearward incline and upright orientation.

The ends of the arms are fastened together to form the stand 720 (see FIG. 11*b*) and this creates a curvature across the document receiving member 715.

FIGS. 11*c* and 11*d* illustrate a side view of the document holder 700 showing the stand 720 attached and deployed.

In each of the examples described the document receiving member is made of thin (e.g., 100-200 micron) plastic sheet material e.g., polypropylene/acetate sheet. The stand material, where it is included as a separate sheet may also be plastic material e.g., polypropylene but heavier duty e.g., 500 micron compared with the document receiving member.

In the examples illustrated in FIGS. 7 and 8, the document receiving member and the foldable panel are formed from a single sheet. Therefore, it will be appreciated a heavier gauge material will be used to ensure the foldable panel is strong and supportive when folded to form a stand.

Whilst specific embodiments of the present invention have been described above, it will be appreciated that departures from the described embodiments may still fall within the scope of the claims.

We claim:

1. A document holder which can be used flat or standing, the document holder comprising:
   - a document receiving member including a front and a back; and
   - at least one foldable flexible panel including a first member and a second member, wherein the first member and the second member are configured to be folded rearwards and inwards and to be joined together to define a stand,
   - wherein the at least one foldable flexible panel is partially attached to the back of the document receiving member, such that to configure the document holder as a standing document holder the at least one foldable panel folds rearwards and inwards relative to the back of the document receiving member, and the first and second members are joined together to create a substantially triangular base member which extends rearward, thereby providing a stand for the document holder.

2. The document holder as claimed in claim 1, wherein the at least one foldable panel and the first and second members are provided by two arms, which are each attached to one edge of the document receiving member proximate a lower edge, wherein the arms are configured to extend diagonally rearwards and inwards to be connected together to provide the substantially triangular base member, thereby providing the stand for the document holder.

3. The document holder as claimed in claim 1, wherein the at least one foldable panel is provided by a rectangular/substantially square-shaped panel which includes four diagonal crease lines forming a cross-shape about which the at least one foldable panel folds to create the substantially triangular base member, thereby providing the stand for the document holder, wherein the first and second members are provided by upper corners of the rectangular/substantially square-shaped panel foldable panel.

4. The document holder as claimed in claim 3, wherein a lower triangular portion, defined by a bottom edge of the at least one foldable panel and two lowermost diagonal crease lines of the at least one foldable panel, is fixed/adhered to the back of the document receiving member, thereby partially attaching the foldable flexible panel to the back of the document receiving member.

5. The document holder as claimed in claim 1, wherein the first and second members and the back of the document receiving member include fasteners that hold the foldable panel in a flat open configuration relative to the back of the document receiving member and wherein the fasteners also join the first and second members when the foldable panel is folded, thereby creating the substantially triangular base member, which extends rearward, thereby providing the stand for the document holder.

6. The document holder as claimed in claim 5, wherein the fasteners are re-usable fasteners.

7. The document holder as claimed in claim 5, wherein the fasteners are provided by press-studs.

8. The document holder as claimed in claim 5, wherein the fasteners are provided by reusable adhesive pads.

9. The document holder as claimed in claim 5, wherein the fasteners are provided by hook and loop tape.

10. The document holder as claimed in claim 5, wherein the fasteners are provided by magnets.

11. The document holder as claimed in claim 1, wherein the document receiving member is a sleeve including at least an open edge, the open edge being an open top edge or an open side edge, wherein the open edge includes a notch.

12. The document holder as claimed in claim 11, further comprising a disc within the document receiving member, wherein an edge of the disc is accessible via the notch.

13. The document holder as claimed in claim 12, wherein the disc is secured to document receiving member about a pivot point to facilitate rotation of the disc relative to the document receiving member.

14. The document holder as claimed in claim 12, wherein the disc includes a grooved outer edge.

15. The document holder as claimed in claim 12, wherein an exposed front face of the document receiving member includes an upper array of holes located around a first circumference which is radially smaller than, but proximate to, the edge the disc and a lower array of holes arranged around a second circumference which is radially smaller than the first circumference of the outer array of holes, wherein the holes are arranged to display a predetermined selection of information printed on the disc.

16. The document holder as claimed in claim 15, wherein the disc is printed with twelve notes of the musical alphabet, wherein an outer circle represents key signatures, where capital letters represent the major keys and an inner circle includes lowercase letters to represent minor keys.

17. The document holder as claimed in claim 1, wherein the document receiving member is a rectangular-shaped sleeve document and the foldable panel is substantially square-shaped and located towards the bottom edge of the document receiving member.

18. The document holder as claimed in claim 1, comprising a folded unitary sheet-material, which in the folded, in use, configuration defines the document receiving member and the foldable panel wherein the document receiving member is defined by an inverted U-shaped folded upper edge, a front panel and a rear panel, wherein the document receiving member includes open side edges, such that a document can be inserted via the side edges and is sandwiched between the front panel and the rear panel; and a U-shaped folded bottom edge, which defines an integral joint between the front panel and the foldable panel and, wherein the bottom folded edge closes an otherwise open bottom edge of the document receiving member.

19. The document holder as claimed in claim 1, comprising a folded unitary sheet of material, defining a bottom edge U-shaped fold, thereby providing a front facing document receiving member defined by a single leaf and a rearward facing foldable panel, which can be folded to form the stand to support the document receiving member in an upright orientation and further comprising at least one retaining member to secure a document to a front face of the document receiving member.

20. The document holder as claimed in claim 19, wherein the retaining member is provided by one or more clasps located proximate an upper, lower or side edge of the document receiving member.

21. The document holder as claimed in claim 1, wherein the foldable panel is attached to the back of the document receiving member by a pivotal connector, such that the foldable panel can rotate relative to the document receiving member such that orientation of the document receiving member, when supported on the stand, can be reoriented between landscape and portrait orientation.

* * * * *